(12) United States Patent
Wang et al.

(10) Patent No.: US 7,586,587 B1
(45) Date of Patent: Sep. 8, 2009

(54) STAND-ALONE SPEEDOMETER USING TWO SPACED LASER BEAMS

(76) Inventors: Ruyong Wang, 917 21st St. SE., St. Cloud, MN (US) 56304; Yi Zheng, 1605 Grizzly La., Sartell, MN (US) 56377; Aiping Yao, 2725 Edward Dr., St. Cloud, MN (US) 56301

( * ) Notice: Subject to any disclaimer, the term of this patent is extended or adjusted under 35 U.S.C. 154(b) by 448 days.

(21) Appl. No.: 11/035,659

(22) Filed: Jan. 14, 2005

Related U.S. Application Data

(60) Provisional application No. 60/536,410, filed on Jan. 14, 2004.

(51) Int. Cl.
   *G01P 3/36* (2006.01)
   *G01C 19/72* (2006.01)
(52) U.S. Cl. .................. 356/28.5; 356/460; 356/482
(58) Field of Classification Search .................. 356/28, 356/28.5, 459, 460, 477, 482
   See application file for complete search history.

(56) References Cited

U.S. PATENT DOCUMENTS

| | | | |
|---|---|---|---|
| 3,791,738 A * | 2/1974 | Newburgh | 356/472 |
| 3,941,481 A * | 3/1976 | Kramer | 356/472 |
| 4,588,296 A * | 5/1986 | Cahill et al. | 356/462 |
| 4,997,282 A * | 3/1991 | Pavlath | 356/460 |
| 5,037,203 A * | 8/1991 | Yeh | 356/459 |
| 5,056,919 A * | 10/1991 | Arditty et al. | 356/464 |
| 6,462,825 B1 * | 10/2002 | Wiebesick | 356/475 |
| 6,650,682 B1 * | 11/2003 | Diels et al. | 372/94 |
| 2006/0145063 A1* | 7/2006 | Steinberg et al. | 250/227.18 |

OTHER PUBLICATIONS

Ruyong Wang, "From the triangle Sagnac experiment to a practical crucial experiment of the constancy of teh speed of light using atomic clocks on moving objects", Europhysics Letters, Sep. 15, 1998; 43, pp. 611-616.*
Wang et al, "Modified Sagnac experiment for measuring travel-time difference between counter-propagating light beams in a uniformly moving fiber", Jun. 2003, pp. 1-4.*

* cited by examiner

*Primary Examiner*—Isam Alsomiri

(57) ABSTRACT

A stand-alone speedometer directly measuring the translational speed of a moving body comprises a source emitting two spaced light beams which interfere each other, mirrors or beam splitters changing directions of propagation of light beams, and a detector measuring the phase difference of light beams. Compared with the phase difference when the speedometer is stationary, the detector measures a first-order change of phase differences, which indicates the motion speed.

2 Claims, 4 Drawing Sheets

Light paths in the speedometer.

- - -  Path11, W1-M11-M12-BS1-Detector1        ······ Path12, W1-M11-BS1-Detector2

———  Path21, W2-M21-M22-BS2-Detector1        ▬▬▬ Path22, W2-M21-BS2-Detector2

STAND-ALONE SPEEDOMETER USING TWO SPACED LASER BEAMS

CROSS-REFERENCE TO RELATED APPLICATIONS

This application claims the benefit of Provisional Patent Application No. 60/536,410, filed Jan. 14, 2004 by Ruyong Wang, Yi Zheng and Aiping Yao.

FIELD OF INVENTION

This invention is generally related to instruments of navigation and more specifically related to a speedometer.

BACKGROUND OF THE INVENTION

Most speedometers measuring translational speed of a moving body either are not stand-alone or do not directly measure the speed. A speedometer that is not stand-alone uses contact information from outside of the moving body. For example, the speedometer in a car only works when the wheel of the car contacts with the ground, the Pitot tube of an airplane only works when the Pitot tube probes the surrounding air, the sonar of a submarine only works when sound wave reflects from some reference objects, and the GPS receiver only works when it receives the signal from the GPS satellites. A speedometer that is not directly measuring the moving speed calculates the speed based on other measurable information. For example, an accelerometer in a navigation system measures the translational acceleration and the translational speed is determined by integrating the accelerometer output with an initial speed.

A patent (U.S. Pat. No. 6,813,006) has invented a stand-alone speedometer directly measuring the translational speed. The present invention provides a new method and a new speedometer that utilizes two spaced laser beams emitted from a laser and measures their travel-time difference.

SUMMARY OF THE INVENTION

In accordance with one aspect of the present invention, a stand-alone speedometer directly measuring the translational speed of a moving body comprises a source emitting two spaced interfering light beams, mirrors or beam splitters changing directions of propagation of said light beams, and detectors measuring the phase difference of said light beams.

According to another aspect of the invention, a method directly measuring the translational speed of a moving body comprises selecting a light source emitting two spaced light beams which interfere each other, changing light beam directions, and measuring the phase difference between the two beams, converting the phase difference to the translational speed of the moving body.

DETAILED DESCRIPTION OF SPECIFIC EMBODIMENTS

The Sagnac effect shows that there is a travel-time difference between two counter-propagating light beams traveling along a rotating path. In the recent generalized Sagnac experiments conducted by Wang et al. (Ruyong Wang, Yi Zheng, Aiping Yao, "Generalized Sagnac Effect", Physical Review Letters 93 (2004) 143901), which publication is hereby incorporated by reference, the travel-time difference of two counter-propagating light beams has been observed in a uniformly and translationally moving glass or air-core fiber while the light source and detector are moving together with fiber in a fiber optic conveyor. The stand-alone speedometer and method directly measuring the translational speed according to this invention utilize the discoveries of the experiments.

The new speedometer is also related to the following general calculation.

Figure 1:
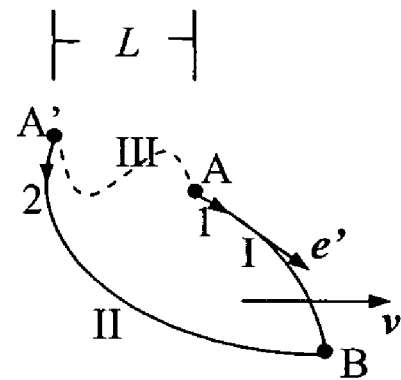
FIG. 1 shows the propagation of two spaced light beams in a medium.

In an apparatus, we have two spaced laser beams which interfere with each other. Light beam 1 starts from A and goes through path I to B, and light beam 2 starts from A' and goes through path II to B (FIG. 1).

Neglecting all terms of higher than the first-order, we have the speed of light u, $$u = c/n - (v \cdot e')/n^2$$

where v is the velocity of the apparatus relative to the preferred frame, c is the constant speed of light in the preferred frame, n is the refractive index and e' is a unit vector in the direction of the path.

Hence, $$1/u = 1/[c/n - (v \cdot e')/n^2] = n/c + (v \cdot e')/c^2$$

We have the travel-time of light beam 1 in path I, $$t_1 = \int_I ds/u = (1/c) \int_I n\,ds + (1/c^2)\left(v \cdot \int_I ds\right)$$

where ds=e'ds.

The travel-time of light beam 2 in path II, $$t_2 = \int_{II} ds/u = (1/c) \int_{II} n\,ds + (1/c^2)\left(v \cdot \int_{II} ds\right)$$

The travel-time difference between two beams is:

$$t_2 - t_1 = \left[(1/c)\int_{II} n\,ds + (1/c^2)\left(v \cdot \int_{II} ds\right)\right] - \Big[$$

-continued $$(1/c)\int_I nds + (1/c^2)\left(v \cdot \int_I ds\right)\Big]$$

Because $$\left(v \cdot \int_{II} ds - v \cdot \int_I ds\right) = v \cdot \left(\int_{II} ds - \int_I ds\right) = v \cdot \int_{III} ds,$$

where III is a virtual and arbitrary path from A' to A, we have $$t_2 - t_1 = (1/c)\left[\int_{II} nds - (1/c)\int_I nds\right] + (1/c^2)\left(v \cdot \int_{III} ds\right)$$

It indicates that the travel-time difference between two beams is related to v, the speed relative to the preferred frame. Therefore, the change of travel-time difference between two beams from stationary to moving is:

$$(t_2 - t_1)_v - (t_2 - t_1)_O = (1/c)\left[\int_{II} nds - (1/c)\int_I nds\right] + (1/c^2)\left(v \cdot \int_{III} ds\right) - \left[(1/c)\int_{II} nds - (1/c)\int_I nds\right] = (1/c^2)\left(v \cdot \int_{III} ds\right) = vL/c^2.$$

which means that the travel time difference of the two spaced laser beams is the first-order effect of v, $vL/c^2$, where the speed is relative to the preferred frame and L is the projection of the path III on the direction of the velocity v. The projection could be positive or negative, depending on the angle between the path and the velocity. It is positive in FIG. 1.

Figure 2:
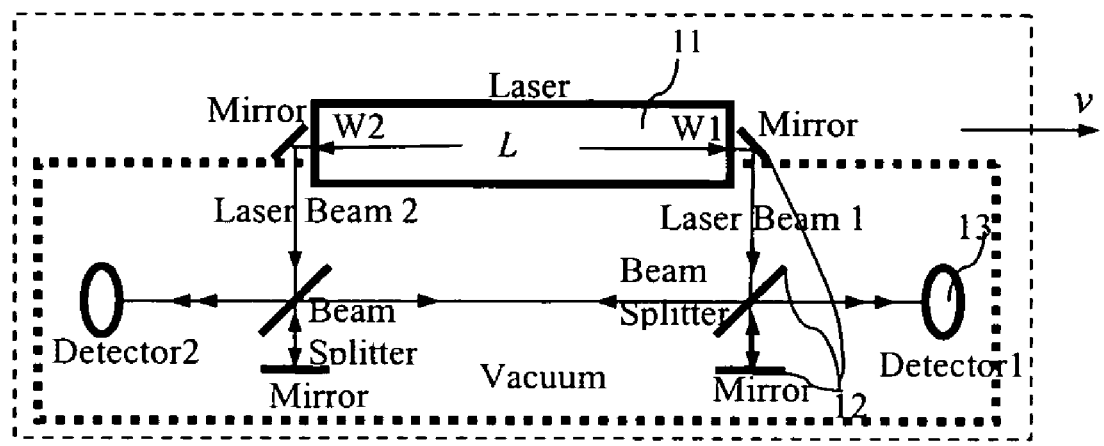
FIG. 2 shows an example of the basic construction of the stand-alone speedometer with the two spaced laser beams emitted from the front and the back ends of a laser.
Figure 3:
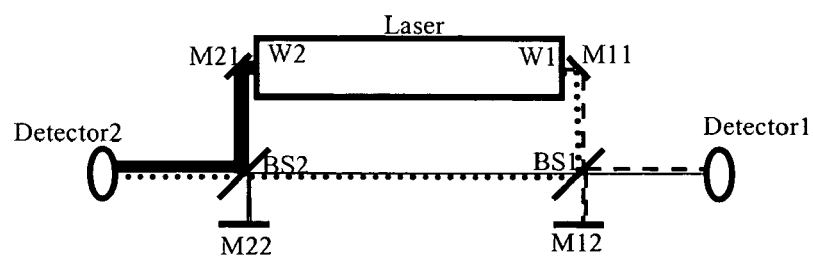
FIG. 3 shows the paths of light beams in the basic construction of the stand-alone speedometer.

The basic construction of the stand-alone speedometer is described hereunder with reference to FIG. 2. There are two spaced light beams emitted from a laser 11. Both light beams are changed the directions on the mirrors and beam splitters 12, and the interference fringes and travel-time differences are detected at two detectors 13. The light paths are shown in FIG. 3. The propagation time intervals via different paths in the speedometer can be specifically calculated below.

The travel-time difference between path21 and path11 is:

$$\Delta t_1 = t_{21} - t_{11} = (1/c)\left(\int_{21} nds - \int_{11} nds\right) + vL/c^2$$

where the projection of path W2-W1 on the direction of the velocity v is L. Thus, $$(\Delta t_1)_v - (\Delta t_1)_0 = (t_{21}-t_{11})_v - (t_{21}-t_{11})_0 = vL/c^2$$

which can be measured by detecting a fringe shift $\Delta f_1 = vL/c\lambda$ on Detector1 when the speedometer has a speed v relative to the preferred frame.

Similarly, the travel-time difference between path12 and path22 is:

$$\Delta t_2 = t_{12} - t_{22} = (1/c)\left(\int_{12} nds - \int_{22} nds\right) - vL/c^2$$

where the projection of path W1-W2 on the direction of the velocity v is −L. Thus, $$(\Delta t_2)_v - (\Delta t_2)_0 = (t_{12}-t_{22})_v - (t_{12}-t_{22})_0 = -vL/c^2$$

which can be measured by detecting a fringe shift $\Delta f_2 = -vL/c\lambda$ on Detector2. Comparing D1 with D2, we have $$[(\Delta t_1)_v - (\Delta t_1)_0] - [(\Delta t_2)_v - (\Delta t_2)_0] = 2vL/c^2$$

It indicates that the difference between the fringe shift on Detector1 and the fringe shift on Detector2, $\Delta f_1 - \Delta f_2$, is $2vL/c\lambda$ when the speedometer moves at a speed v.

In this configuration, each fringe shift on Detector1 or Detector2 is sensitive to the stability of the optical path having the length of L, but the value of the difference between them, $(\Delta f_1 - \Delta f_2)$, is not sensitive to the stability of the optical path and it is optically stable.

If the air can be removed from the apparatus, the fringe shifts on two detectors will be more stable.

As an example, if we can detect the difference between the fringe shifts, $\Delta f_1 - \Delta f_2$, with a sensitivity of $10^{-4}$ fringe, we can detect a speed or a speed difference as small as $10^{-4} c\lambda/2L = 3 \cdot 10^{-2}$ m/s with L=0.3 m and $\lambda$=0.6 μm.

Figure 4:
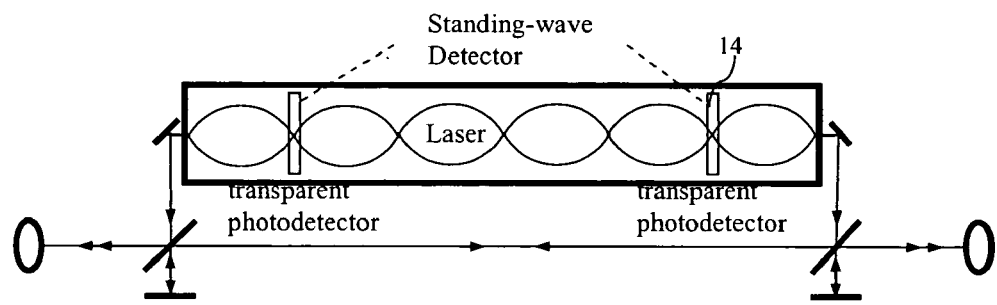
FIG. 4 shows standing wave detectors in a laser cavity.

There is an implied assumption in the calculations above that the phase difference between two spaced beams is constant when they leave the laser cavity. This assumption is true because only standing waves are built in the laser resonant cavity and the phase difference of two ends of a standing wave is nπ. To check this, standing-wave detectors 14, transparent photodetectors, can be located in the resonant cavity (FIG. 4). Otherwise, the changes of measurements of the standing-wave detectors measure the motion.

This speedometer has several features:

1) Two beams in the main part of the speedometer propagate in the same path but in opposite directions for the two detectors. Therefore, this speedometer is optically stable if the difference of the two detectors is used. It is very important for a speedometer mounted on a moving object.

2) When the speedometer is moving at a speed v, the speed can be measured by comparing travel-time differences before and after turning the speedometer 90 degrees because we have $(\Delta f_1 - \Delta f_2)_{(90)} = 0$ after turning 90 degrees. Therefore, the measurement is $v = [(\Delta f_1 - \Delta f_2) - (\Delta f_1 - \Delta f_2)_{(90)}]c\lambda/2L$.

3) After turning the speedometer 180 degrees, the speed v becomes speed −v and we have $(\Delta f_1 - \Delta f_2)_{(180)} = -2vL/c\lambda$. Therefore, the measurement will be doubled by comparing the fringes before and after turning 180 degrees, it is $(\Delta f_1 - \Delta f_2) - (\Delta f_1 - \Delta f_2)_{(180)} = 4vL/c\lambda$.

Figure 5:
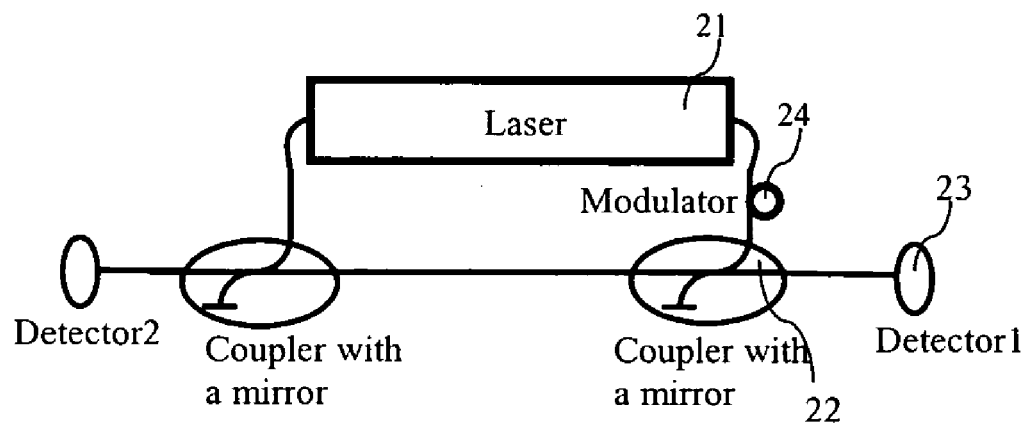
FIG. 5 shows an alternative construction of the stand-alone speedometer with the two spaced laser beams emitted from the front and the back ends of a laser using fiber technology.

This speedometer can be also constructed with fiber technology. An alternative construction of the stand-alone speedometer is described hereunder with reference to FIG. 5. There are two spaced light beams emitted from the front and back ends of a laser 21. Both light beams are changed the directions on the couplers with mirrors 22, and the interference phase and travel-time differences are detected at two detectors 23. A modulator 24 can be utilized to increase the sensitivity of the speedometer if it is necessary. This fiber speedometer is similar to the fiber optic conveyor. Therefore the difference between the phase shift on Detector1 and the phase shift on Detector2, $\Delta\phi_1 - \Delta\phi_2$, is $4\pi vL/c\lambda$ when the speedometer moves at a speed v. If we can detect the difference between the phase shifts, $\Delta\phi_1 - \Delta\phi_2$, with a sensitivity of $10^{-7}$ radians, we can detect a speed or a speed difference as small as $10^{-7} c\lambda/4\pi L = 8$ μm/s with L=0.3 m and λ=1 μm. The fiber can be glass, air-core or vacuum-core fiber.

Figure 6:
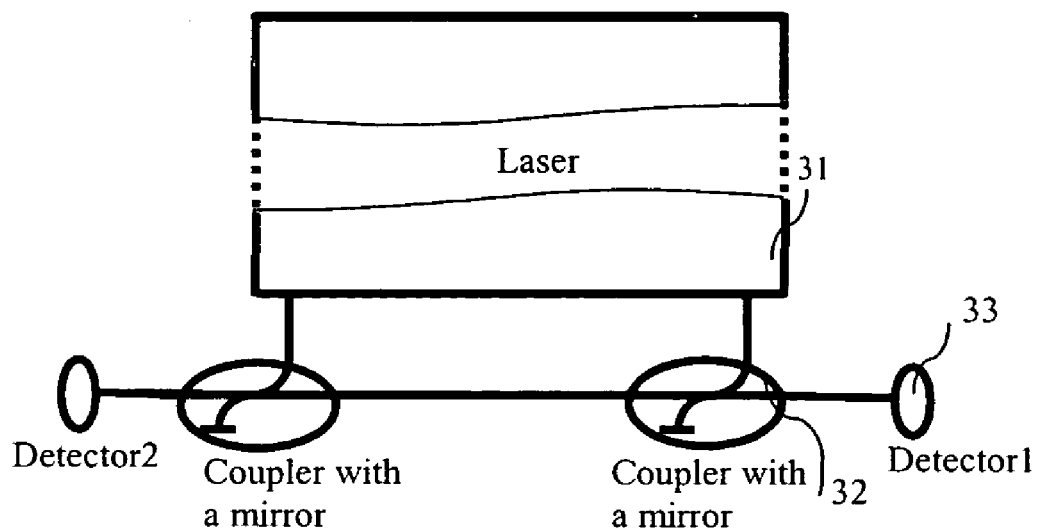
FIG. 6 shows an alternative construction of the stand-alone speedometer with the two spaced laser beams emitted from a wide laser cavity.

Another alternative construction of the stand-alone speedometer is described hereunder with reference to FIG. 6. There are two spaced light beams emitted from the same end of a wide laser cavity 31. Both light beams are changed the directions on the couplers with mirrors 32. The interference fringes and travel-time differences are detected at two detectors 33.

Figure 7:
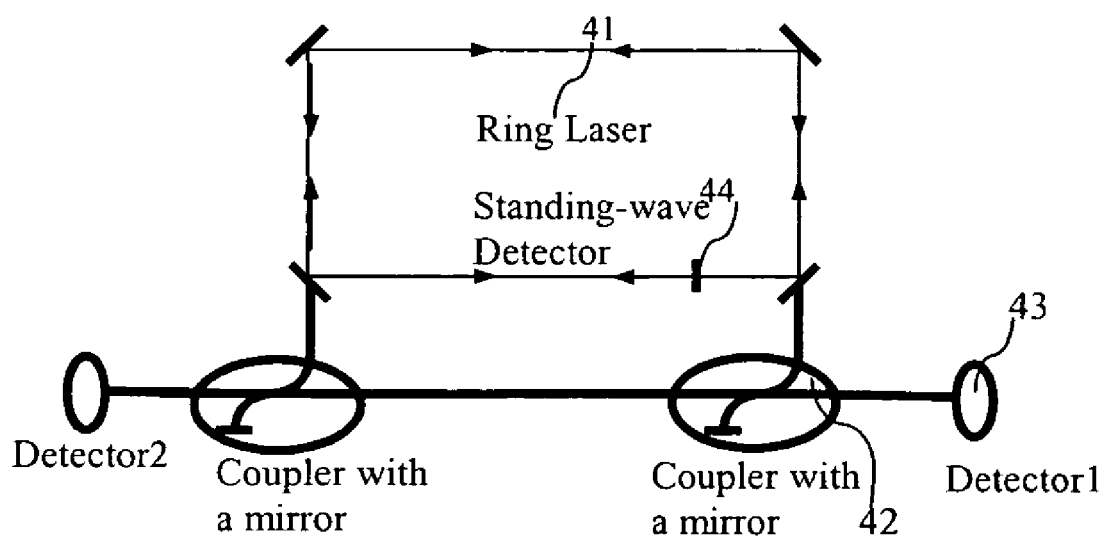
FIG. 7 shows an alternative construction of the stand-alone speedometer with the two spaced laser beams emitted from a ring laser.

Another alternative construction of the stand-alone speedometer is described hereunder with reference to FIG. 7. There are two spaced light beams emitted from the same ring laser 41. Both light beams are changed the directions on the couplers with mirrors 42. The interference fringes and travel-time differences are detected at two detectors 43. A standing-wave detector 44 can be located in the ring laser cavity.

An apparatus using three stand-alone speedometers can measure motion in three-dimensional space.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A speedometer, comprising:
   a. a laser cavity directly and immediately emitting two spaced light beams which interfere each other, and having an internal standing-wave detector to measure the phase difference between said two spaced light beams,
   b. mirrors and/or beam splitters changing the directions of said two beams,
   c. a detector for measuring the phase difference of said two beams,
   whereby said speedometer will be a stand-alone speedometer for measuring the translational speed of a moving body.

2. A method of directly measuring the translational speed of a moving body comprising,
   a. selecting a laser cavity directly and immediately emitting two spaced light beams which interfere each other, and having an internal standing-wave detector to measure the phase difference between said two spaced light beams,
   b. changing the light beams directions,
   c. measuring the phase difference between said two light beams,
   d. converting said phase difference to the translational speed of the moving body.

* * * * *